(12) United States Patent
Grgac et al.

(10) Patent No.: US 9,038,273 B2
(45) Date of Patent: May 26, 2015

(54) SHIPPING PALLET POST REINFORCEMENT

(71) Applicant: Magna International Inc., Aurora (CA)

(72) Inventors: Steven Grgac, Mississauga, CA (US); Stephen R. Roddy, Harrison Township, MI (US); Matthew R. Plauman, New Baltimore, MI (US)

(73) Assignee: Magna International Inc., Aurora (CA)

( * ) Notice: Subject to any disclaimer, the term of this patent is extended or adjusted under 35 U.S.C. 154(b) by 180 days.

(21) Appl. No.: 13/727,853

(22) Filed: Dec. 27, 2012

(65) Prior Publication Data

US 2013/0111724 A1   May 9, 2013

Related U.S. Application Data

(62) Division of application No. 12/910,403, filed on Oct. 22, 2010, now abandoned.

(51) Int. Cl.
*B65D 19/00* (2006.01)
*B23P 11/00* (2006.01)

(52) U.S. Cl.
CPC .............. *B23P 11/00* (2013.01); *B65D 19/0016* (2013.01); *B65D 2519/00034* (2013.01); *B65D 2519/00069* (2013.01); *B65D 2519/00104* (2013.01); *B65D 2519/00124* (2013.01); *B65D 2519/00129* (2013.01); *B65D 2519/00134* (2013.01); *B65D 2519/00139* (2013.01); *B65D 2519/00273* (2013.01); *B65D 2519/00288* (2013.01); *B65D 2519/00318* (2013.01); *B65D 2519/00333* (2013.01); *B65D 2519/00373* (2013.01); *B65D 2519/00412* (2013.01); *B65D 2519/00432* (2013.01); *B65D 2519/00447* (2013.01); *B65D 2519/00562* (2013.01); *B65D 2519/008* (2013.01)

(58) Field of Classification Search
CPC ........... B65D 19/0012; B65D 19/0016; B65D 19/0038; B65D 19/0073; B65D 19/0096; B29C 66/45
USPC ............. 29/897, 428, 897.1; 108/56.3, 57.26, 108/57.33
See application file for complete search history.

(56) References Cited

U.S. PATENT DOCUMENTS

| 5,351,629 | A |   | 10/1994 | Breezer et al. |
| 5,367,961 | A |   | 11/1994 | Arai et al. |
| 5,413,052 | A |   | 5/1995 | Breezer et al. |
| 5,483,899 | A | * | 1/1996 | Christie ........................ 108/56.3 |
| 5,492,069 | A |   | 2/1996 | Alexander et al. |
| 6,564,725 | B2 | * | 5/2003 | Hale ........................... 108/57.25 |
| 6,807,910 | B2 |   | 10/2004 | Apps |
| 7,252,041 | B2 |   | 8/2007 | Overholt et al. |

(Continued)

*Primary Examiner* — David Bryant
*Assistant Examiner* — Jun Yoo
(74) *Attorney, Agent, or Firm* — Warn Partners, P.C.

(57) ABSTRACT

A shipping pallet having a top deck, a bottom skid, and a plurality of posts disposed between and separating the top deck and the bottom skid such that at least one tow fork is able to be positioned between the top deck and the bottom skid. The shipping pallet also includes a plurality of collars formed as part of the top deck, and the posts are integrally formed as part of the bottom skid. Each of the plurality of posts is received into and connected to a respective one of the plurality of collars. There is also a plurality of reinforcements, and each of the reinforcements is disposed within and surrounded by a post. Each post and reinforcement is received into one of the collars, and the post is connected to the collar through a connection point, such as an adhesive joint or thermoplastic weld.

11 Claims, 4 Drawing Sheets

(56) References Cited

U.S. PATENT DOCUMENTS

| | | |
|---|---|---|
| D584,874 S | 1/2009 | Sasnowski |
| 7,748,329 B2 | 7/2010 | Baltz |
| 8,091,487 B2 | 1/2012 | Apps |
| 2003/0075081 A1 | 4/2003 | Apps |
| 2005/0103236 A1 | 5/2005 | Apps |
| 2006/0032413 A1 | 2/2006 | Ogburn et al. |
| 2006/0236904 A1 | 10/2006 | Apps et al. |
| 2007/0256609 A1* | 11/2007 | Naidu et al. .......... 108/108 |
| 2008/0236455 A1 | 10/2008 | Naidu |
| 2010/0212553 A1 | 8/2010 | Baltz |
| 2010/0229765 A1 | 9/2010 | Shafer |
| 2011/0120353 A1 | 5/2011 | Jensen et al. |
| 2011/0259248 A1 | 10/2011 | Grgac et al. |
| 2011/0259249 A1 | 10/2011 | Ogburn et al. |

\* cited by examiner

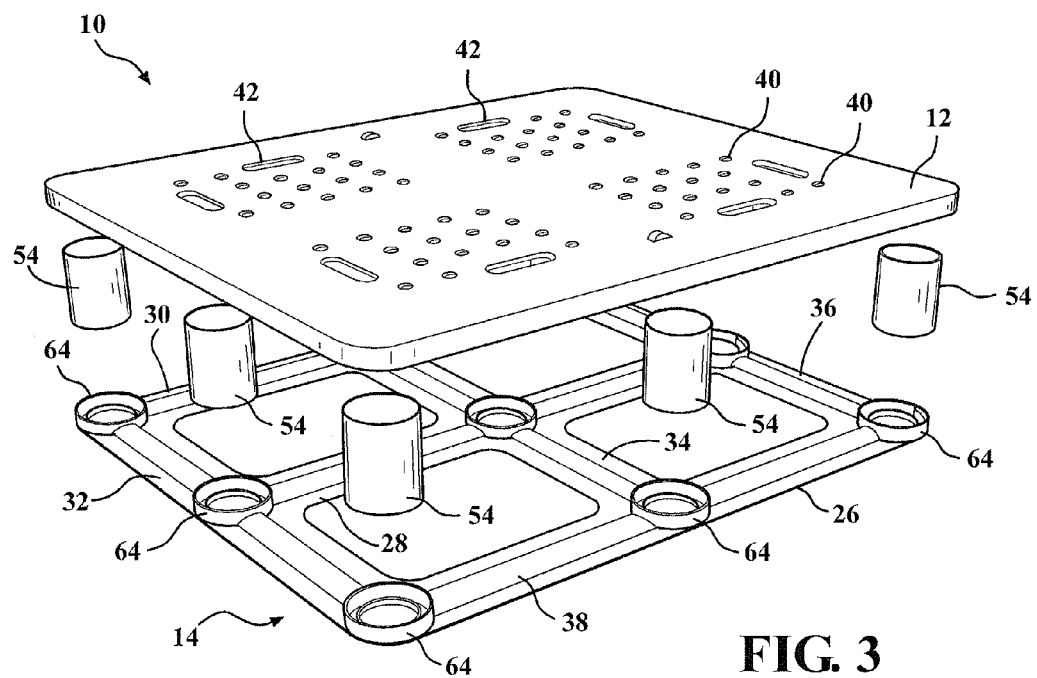
FIG. 3
FIG. 4
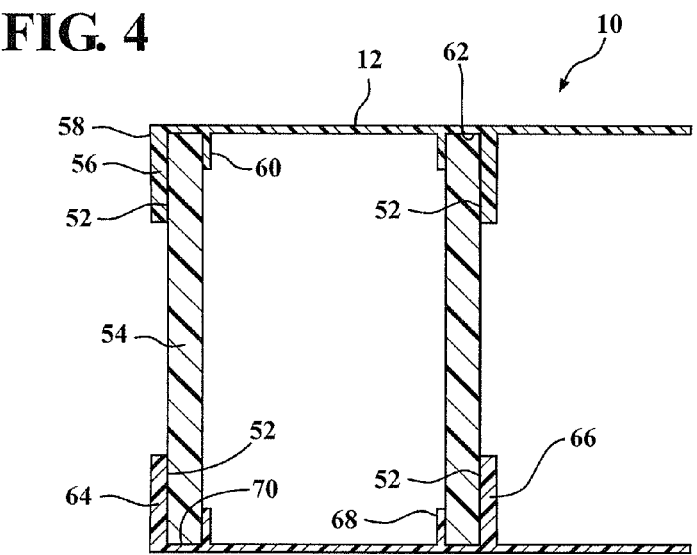

SHIPPING PALLET POST REINFORCEMENT

CROSS-REFERENCE TO RELATED APPLICATIONS

This application is a Divisional Application of U.S. patent application Ser. No. 12/910,403, filed Oct. 22, 2010, which claims priority to U.S. Provisional Application No. 61/279,785 filed on Oct. 26, 2009. The disclosure of the above application is incorporated herein by reference.

FIELD OF THE INVENTION

The present invention relates to a pallet made of a composite material which meets various tow fork impact requirements.

BACKGROUND OF THE INVENTION

Pallets are a common device used for stowing and transporting items during shipping. Pallets typically consist of a top deck, a bottom skid, and several supports positioned in between such that there is space between the top deck and bottom skid. The space allows for the tow forks of a fork lift truck to be positioned in between the top deck and bottom skid such that the pallet, and hence anything stowed on the pallet, is able to be lifted and moved from one place to another. This is especially useful when items are being loaded and unloaded during shipping.

In the past, pallets were generally made of wood, but there has been an increasing interest in making pallets out of plastic materials because pallets made of plastic are more durable than pallets made from wood. However, pallets must possess certain strength requirements. More specifically, the supports must be able to withstand the impact from the forks of the fork lift or other vehicle used for moving the pallets, as well as support the load placed on the pallet. Pallets are commonly exposed to impact from the tow forks from a fork lift because they are moved so frequently, and used for transporting various items on essentially a daily basis.

Attempts to make pallets out of plastic composite materials have proven to be unsuccessful. One of the reasons for this is that in order for the posts to posses the proper amount of strength to resist impact from tow forks, the posts must have a certain thickness; they must be manufactured with a thickness of nine millimeters to possess the proper strength. However, for typical injection molding cycle times, wall stock thicknesses of the posts should be between three and six millimeters. Posts with the typical wall thickness of three to six millimeters (which are common injection molding wall thicknesses), cannot absorb impact from tow forks; the fork penetrates the post upon impact. Conversely, plastic material having a thickness of nine millimeters (which provides sufficient resistance to tow fork impact) requires longer molding cycle times, which is considered undesirable and uneconomical.

Another approach to solving this problem is to use high-density polyethylene (HDPE), which has the ability to stretch under load applied from tow forks, with an integrated steel roll reinforcement, such as steel roll formed sections or pipes to carry loads which are contained within a welded HDPE assembly. Using this design is often considered undesirable because it is so costly.

Accordingly, there exists a need for an improved manufacturing method for making pallets out of a composite material.

SUMMARY OF THE INVENTION

The present invention is a pallet having a reinforcement used for stowing and transporting items for shipping. The pallet design of the present invention uses composite materials such as sheet molding compound (SMC), 40% long glass fiber-filled polypropylene (LGFPP), or 40% long glass fiber-filled high-density polyethylene (LGFHDPE), to eliminate the need for steel reinforcement sections, while still meeting tow fork impact requirements and being economical.

The present invention includes molding the supports, which are typically hollow posts molded using unfilled resins, and then assembling the top deck and bottom skid onto the posts, and applying a weld or adhesive joint to the posts to complete the assembly.

One object of this invention is to develop an economical approach of reinforcing pallet posts to absorb tow fork impact.

More specifically, the present invention is a shipping pallet having a top deck, a bottom skid, and a plurality of posts disposed between and separating the top deck and the bottom skid such that at least one tow fork is able to be positioned between the top deck and the bottom skid. The shipping pallet of the present invention also includes a plurality of collars.

In one embodiment, the plurality of collars is formed as part of the top deck, and the posts are integrally formed as part of the bottom skid. Each of the plurality of posts is received into and connected to a respective one of the plurality of collars. There is also a plurality of reinforcements, and each of the reinforcements is disposed within and surrounded by a post. Each post and reinforcement is received into one of the collars, and the post is connected to the collar through a connection point, such as an adhesive joint or thermoplastic weld.

In an alternate embodiment, the collars are formed as part of the bottom skid, and the posts are integrally formed as part of the top deck.

In another alternate embodiment, there are collars formed on both the top deck and bottom skid, and the posts are received into and connected to both the collars on the top deck, and the collars on the bottom skid. In this embodiment, the posts are of an increased thickness such that the reinforcements are not necessary.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is an exploded perspective view of a pallet, according to a second embodiment of the present invention;

FIG. 4 is a sectional side view of a support used for a pallet, according to a second embodiment of the present invention;

DETAILED DESCRIPTION OF THE PREFERRED EMBODIMENTS

The following description of the preferred embodiment(s) is merely exemplary in nature and is in no way intended to limit the invention, its application, or uses.

Figure 1:
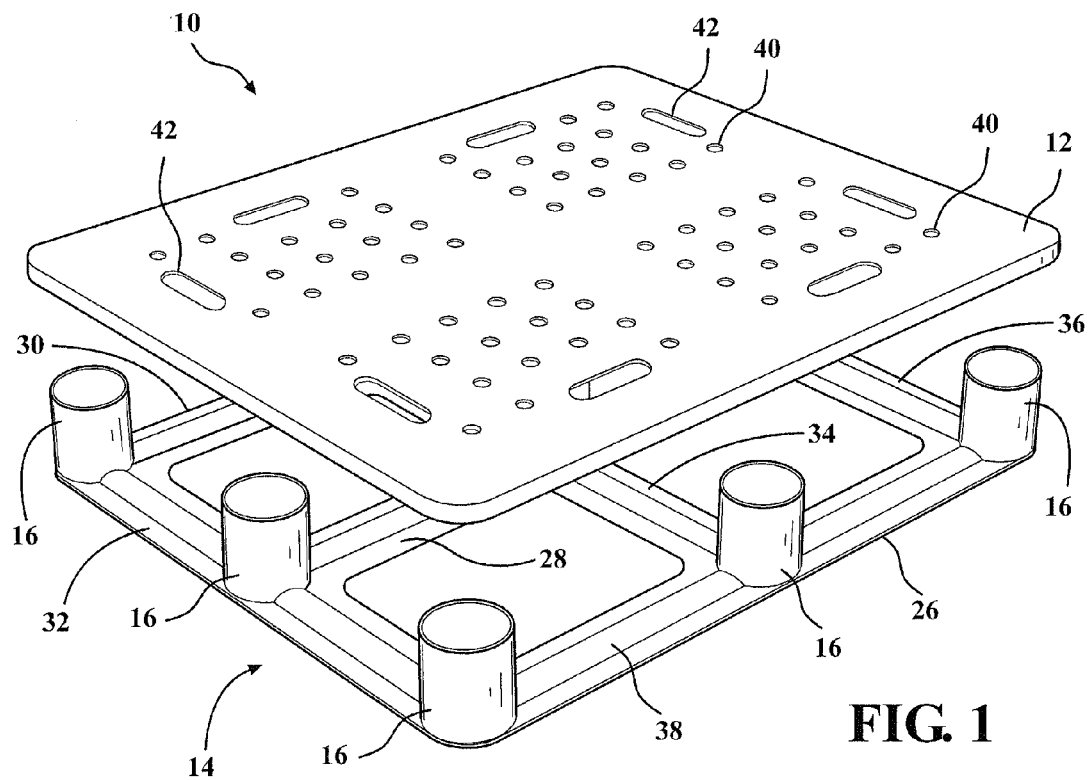
FIG. 1 is an exploded perspective view of a pallet, according to a first embodiment of the present invention.
Figure 2:
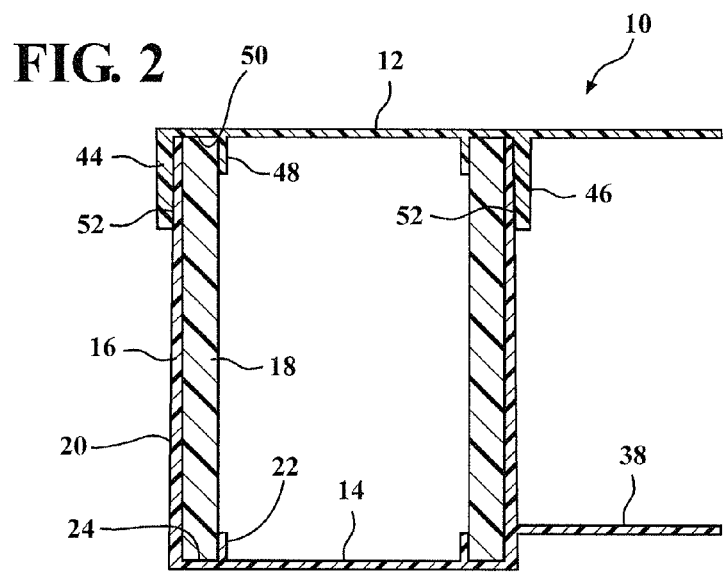
FIG. 2 is a sectional side view of a support used for a pallet, according to a first embodiment of the present invention.

A first embodiment of a pallet according to the present invention in shown in FIGS. 1 and 2 generally at 10. The pallet 10 includes a top deck 12, a bottom skid 14, and a plurality of supports, or in this embodiment, posts 16. Disposed within the posts 16 are reinforcements 18. In this embodiment, the posts 16 are integrated or molded with the bottom skid 14, but it is within the scope of the invention that the posts 16 may be integrated with the top deck 12 instead of the bottom skid 14. The posts have an outer wall 20 and a shorter inner wall 22, and the walls 20,22 form a first circular inner groove 24, which the reinforcement 18 is received into. In this embodiment, the reinforcements 18 are cylindrical and hollow, allowing each reinforcement 18 to be received into one of the respective grooves 24 of one of the posts 16.

During the manufacturing process, the top deck 12 and bottom skid 14 are formed using an injection molding process. The bottom skid 14 includes a plurality of cross members, which are substantially perpendicular to one another. More specifically, there is a first cross member 26, a second cross member 28, a third cross member 30, which are perpendicular to a fourth cross member 32, a fifth cross member 34, and a sixth cross member 36. There is a ribbed portion, or raised portion 38 formed as part of each of the cross members 26,28,30,32,34,36 used for providing added strength to the bottom skid 14 as the skid 14 is formed during the injection molding process. In one embodiment, the inner wall 22 of the post 16 may be of a shorted height compared to the ribbed portion 38, if desired.

Additionally, there are various apertures 40 and slots 42 which are used for attaching items to the top deck 12, as well as allowing sprinkler water to drain through a stack of pallets 10 in case of a fire in a warehouse where a group of the pallets 10 are being stored.

Once the top deck 12, bottom skid 14, and posts 16 are formed, the reinforcements 18 are inserted into the posts 16 as shown in FIG. 2, such that each reinforcement 18 is received into a respective groove 24, as mentioned above. When assembled, the outer wall 20 substantially surrounds the reinforcement 18, best seen in FIG. 2. The top deck 12 is then assembled to the posts 16. In this embodiment, the top deck 12 has a plurality of collars 44 which receive the posts 16 and reinforcements 18. The collars 44 include an outer wall 46 and an inner wall 48, with the outer wall 46 extending downwardly further than the inner wall 46. The outer wall 46 and inner wall 48 form a second circular inner groove 50, which receives both the post 16 and the reinforcement 18, as shown in FIG. 2.

A connection point 52 is formed between the outer wall 20 of the post 16 and the outer wall 44 to connect the post 16 and the top deck 12. In this embodiment, the connection point 52 is a thermoplastic weld or adhesive joint, this secures the top deck 12 to the posts 16. The connection point 52 of the present invention may be any type of thermoplastic weld for assembly, such as, but not limited to, resistive implant welding, laser welding, vibration welding, and the like. Once the top deck 12 is secured to the posts 16, the pallet 10 is assembled. Because the reinforcements 18 are used, the posts 16 are able to be molded using wall stock thicknesses (which are optimal for providing a thermoplastic weld or adhesive joint) of between three and six millimeters, resulting in no cycle time penalties.

In this embodiment, the reinforcements 18 are made of extruded or injection molded materials. Different types of materials include reclaimed post consumer or industrial waste, and can be made of wood, steel, or the like. Reclaimed wound paper core of significant thickness is suitable as well.

Once assembled, the posts 16 provide the proper amount of spacing between the top deck 12 and the bottom skid 14 to allow the tow forks of a fork lift (not shown) to be placed in between the deck 12 and skid 14, allowing the pallet 10 to be moved from one location to another.

A second embodiment of a pallet according to the present invention is shown in FIGS. 3 and 4, where like numbers refer to like elements. This embodiment has different posts 54 compared to what is shown in the first embodiment. The posts 54 are separate components from both the top deck 12 and the bottom skid 14, and both the top deck 12 and bottom skid 14 have collars 56,64 designed to receive the posts 54. The collars 56,64 in this embodiment are similar to the collars 44 shown in FIG. 2. More specifically, there is a plurality of upper collars 56 formed as part of the top deck 12, each having an outer wall 58 and an inner wall 60, and the walls 58,60 form a third circular inner groove 62. There is also a plurality of lower collars 64 formed as part of the bottom skid 14, each of the collars 64 having an outer wall 66 and inner wall 68, and the walls 66,68 form a fourth circular inner groove 70. Once the posts 54 are disposed in the collars 56,64, a connection point 52 is used to secure the posts 54 to the top deck 12 and bottom skid 14.

In this embodiment, there is no reinforcement. The posts 54 are made of an extruded pipe section with a single polymer, and are flame retardant. However, it is within the scope of this invention that the posts 54 in this embodiment may be co-extruded pipe section with dissimilar materials on different layers of the pipe, such as flame retardant, UV stabilizers, polypropylene, or colorants on the outer layer and raw HDPE on the inner layer. Glass fillers may also be used. The posts 54 in this embodiment are thicker such that a reinforcement is not necessary. Additionally, since the posts 54 are not molded using the same injection molding process as the top deck 12 and bottom skid 14, the molding cycle time is not affected.

Figure 5:
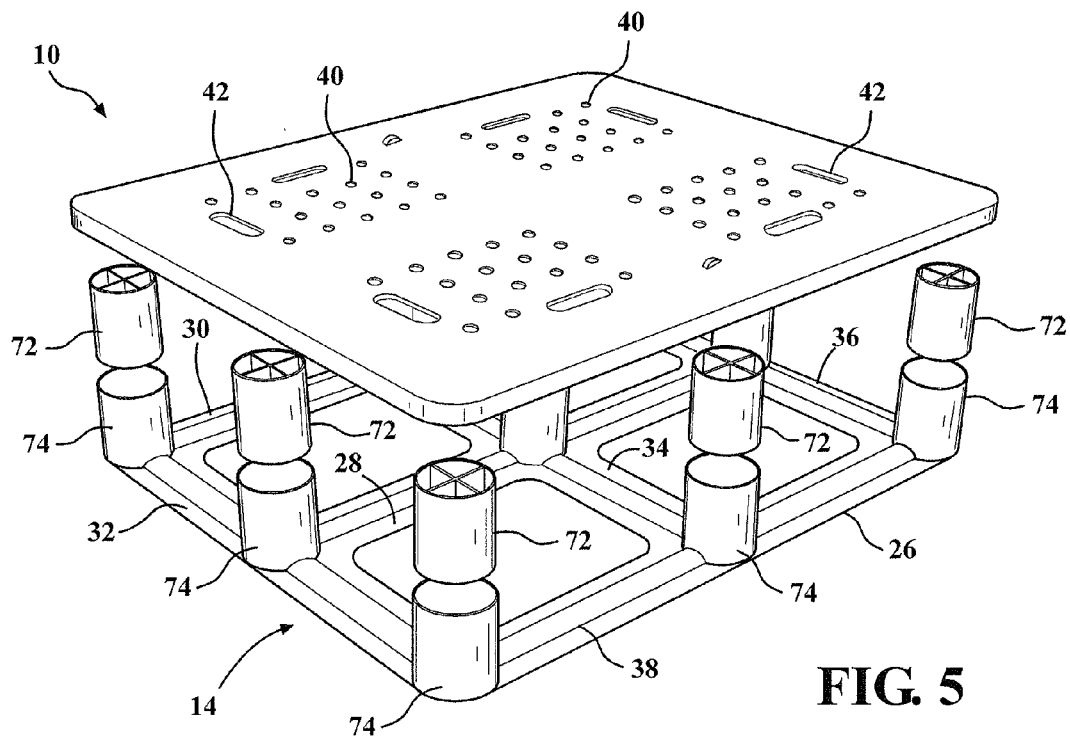
FIG. 5 is an exploded perspective view of a pallet, according to a third embodiment of the present invention.
Figure 6:
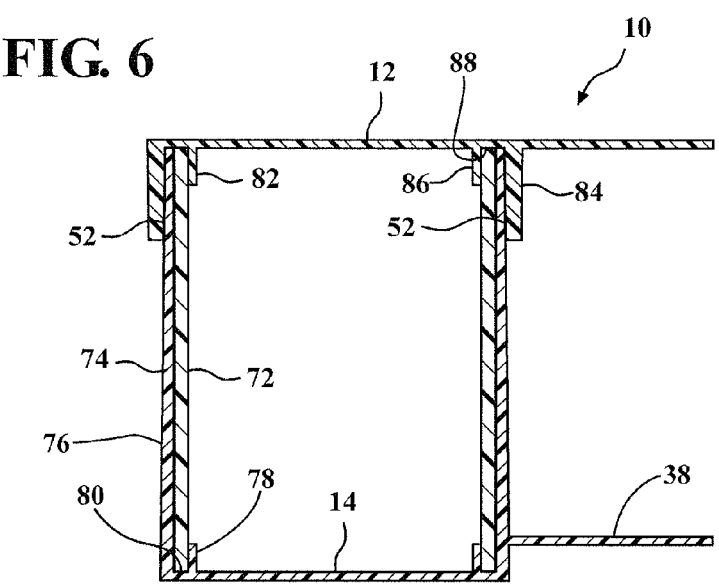
FIG. 6 is a sectional side view of a support used for a pallet, according to a third embodiment of the present invention.
Figure 7:
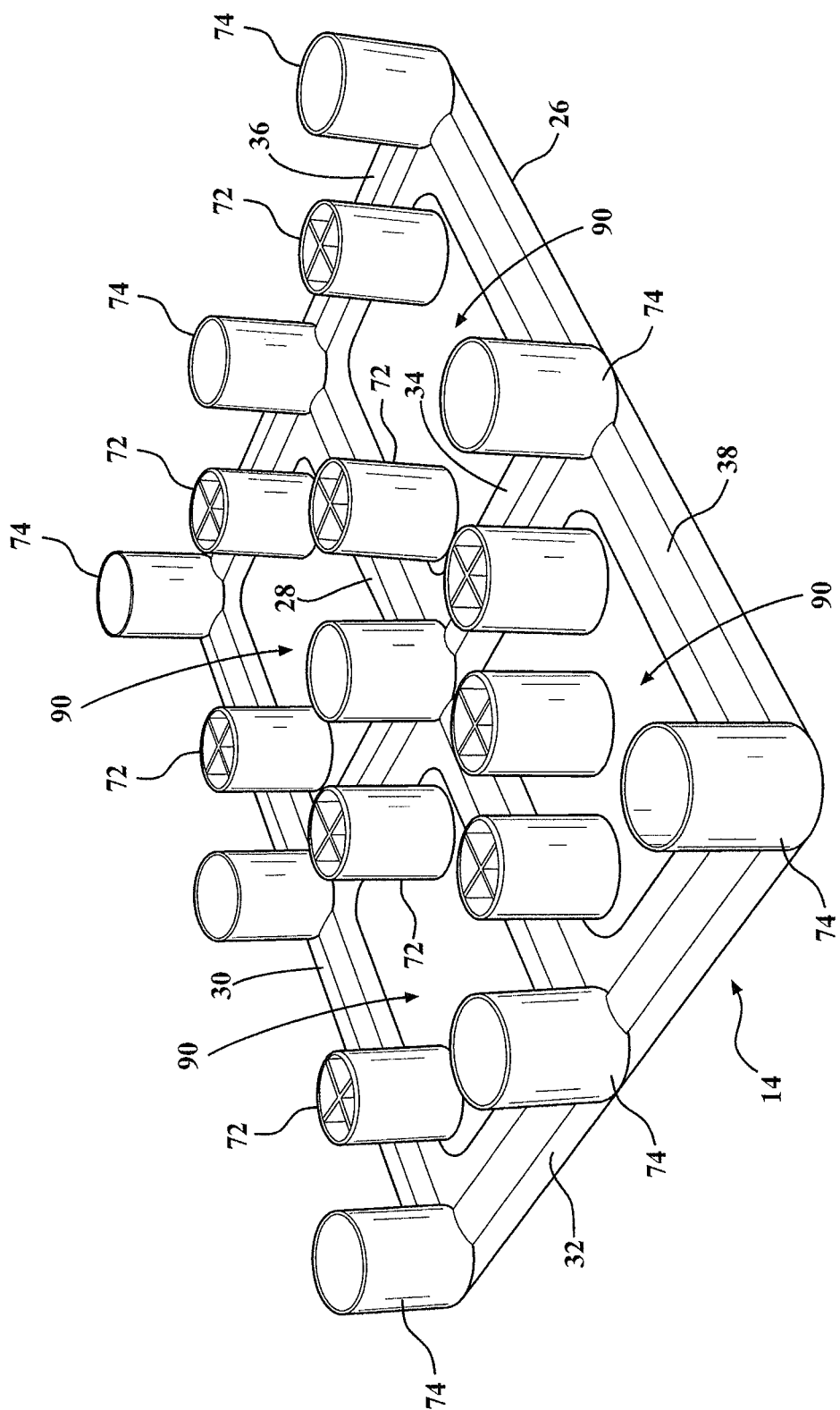
FIG. 7 is a perspective view of a bottom skid and support reinforcements, according to a third embodiment of a present invention.

A third embodiment of a pallet 10 according to the present invention is shown in FIGS. 5-7, where like numbers refer to like elements. In this embodiment, a reinforcement is also included, however, the reinforcements 72 in this embodiment are made of the same material as the top deck 12 and bottom skid 14. The posts 74 are integrally formed with the bottom skid 14, and in a similar manner to the previous embodiments, include an outer wall 76 and an inner wall 78, which form a fifth circular inner groove 80. However, it is within the scope of the invention that the posts 74 may be integrally formed with the top deck 12, instead of the bottom skid 14.

The top deck 12 also has a plurality of collars 82 having an outer wall 84 and an inner wall 86, which form a sixth circular inner groove 88. When assembled, the reinforcement 72 is received into the fifth circular inner groove 80, and the ends of both the reinforcement 72 and the posts 74 are received into the sixth circular inner groove 88, best shown in FIG. 6.

The reinforcements 72 are formed using voids 90 in the area of the mold that is used for creating the bottom skid 14 and posts 74. In this and all of the other embodiments, the bottom skid 14 includes the raised portion 38 to provide the proper amount of strength, while reducing material usage, and therefore reducing weight. Once the reinforcements 72 are formed, they are inserted into the posts 74, and the posts 74 are connected to the top deck 12 through the use of a thermoplastic weld or adhesive joint 52. Using the reinforcements 72 in this manner does not have an effect on the molding cycle times of the bottom skid 14 and the top deck 12, while at the same time the reinforcements 72 provide for the posts 74 to have a sufficient amount of strength.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A method for reinforcing a post formed as part of a shipping pallet, comprising the steps of:
    providing a top deck;
    providing a bottom skid;
    providing at least one post each of said at least one post having an outer wall and a shorter inner wall, said outer wall and said shorter inner wall form a first circular inner groove;
    integrally forming at least one collar with one of said top deck or said bottom skid; and
    at least partially inserting said at least one post into said at least one collar such that said at least one post separates said top deck from said bottom skid;
    providing at least one reinforcement;
    inserting said at least one reinforcement into said first circular inner groove of said at least one post to increase the strength of said at least one post;
    providing at least one void as part of said bottom skid;
    forming said at least one reinforcement in said at least one void during the molding of said bottom skid.

2. The method for reinforcing a post formed as part of a shipping pallet of claim 1, further comprising the steps of:
    providing at least one collar to be further comprised of a plurality of collars integrally formed as part of said bottom skid;
    providing said at least one post to be further comprised of a plurality of posts integrally formed as part of said top deck;
    positioning at least part of each of said plurality of posts into a respective one of said plurality of collars;
    providing said at least one reinforcement to be further comprised of a plurality of reinforcements; and
    disposing each of said plurality of reinforcements within a respective one of said plurality of posts.

3. The method for reinforcing a post formed as part of a shipping pallet of claim 1, further comprising the steps of making said at least one reinforcement from one selected from the group consisting of reclaimed post consumer waste, reclaimed post industrial waste, wood, steel, reclaimed wound paper core, and combinations thereof.

4. The method for reinforcing a post formed as part of a shipping pallet of claim 1, further comprising the steps of:
    providing an outer wall formed as part of said at least one collar;
    providing an inner wall formed as part of said at least one collar;
    forming at least one groove with said outer wall and said inner wall;
    inserting at least a portion of said at least one post into said at least one groove; and
    providing a connection point to connect said at least one post to said outer wall.

5. The method for reinforcing a post formed as part of a shipping pallet of claim 1, further comprising the steps of:
    forming at least one cross member as part of said bottom skid; and
    integrally forming said at least one collar being as part of said at least one cross member.

6. The method for reinforcing a post formed as part of a shipping pallet of claim 1, further comprising the steps of:
    providing at least one aperture formed as part of said top deck; and
    providing at least one slot formed as part of said top deck, both of said at least one aperture and said at least one slot operable for allowing liquid to drain from said top deck.

7. A method for reinforcing a post formed as part of a shipping pallet, comprising the steps of:
    providing a top deck;
    providing a bottom skid;
    providing at least one post;
    providing at least one collar to be further comprised of a plurality of collars integrally formed as part of said top deck;
    providing said at least one post to be further comprised of a plurality of posts integrally formed as part of said bottom skid;
    positioning at least part of each of said plurality of posts into a respective one of said plurality of collars;
    providing said at least one reinforcement to be further comprised of a plurality of reinforcements;
    disposing each of said plurality of reinforcements within a respective one of said plurality of posts;
    integrally forming at least one collar with one of said top deck or said bottom skid; and
    at least partially inserting said at least one post into said at least one collar such that said at least one post separates said top deck from said bottom skid;
    providing at least one reinforcement;
    inserting said at least one reinforcement into said at least one post to increase the strength of said at least one post;
    providing at least one void as part of said bottom skid; and
    forming said at least one reinforcement in said at least one void during the molding of said bottom skid.

8. A method for reinforcing a post formed as part of a shipping pallet, comprising the steps of:
    providing a top deck;
    providing a bottom skid;
    providing at least one post;
    providing an outer wall formed as part of said at least one collar;
    providing an inner wall formed as part of said at least one collar;
    forming at least one groove with said outer wall and said inner wall;
    inserting at least a portion of said at least one post and said at least one reinforcement into said at least one groove;
    providing a connection point to connect said at least one post to said outer wall of posts;
    integrally forming at least one collar with one of said top deck or said bottom skid; and
    at least partially inserting said at least one post into said at least one collar such that said at least one post separates said top deck from said bottom skid;
    providing at least one reinforcement;
    inserting said at least one reinforcement into said at least one post to increase the strength of said at least one post;
    providing at least one void as part of said bottom skid; and
    forming said at least one reinforcement in said at least one void during the molding of said bottom skid.

9. A method for reinforcing a post formed as part of a shipping pallet, comprising the steps of:
    providing a top deck;
    providing a bottom skid;
    providing at least one post;

providing said at least one collar to be further comprised of a plurality of collars;
forming a portion of said plurality of collars as part of said top deck;
forming a portion of said plurality of collars as part of said bottom skid;
providing said at least one post to be further comprised of a plurality of posts;
extending each of said plurality of posts into one of said plurality of collars formed as part of said top deck;
extending each of said plurality of posts into one of said plurality of collars formed as part of said bottom skid of posts;
integrally forming at least one collar with one of said top deck or said bottom skid; and
at least partially inserting said at least one post into said at least one collar such that said at least one post separates said top deck from said bottom skid;
providing at least one reinforcement;
inserting said at least one reinforcement into said at least one post to increase the strength of said at least one post;
providing at least one void as part of said bottom skid; and
forming said at least one reinforcement in said at least one void during the molding of said bottom skid.

10. A method for reinforcing a post formed as part of a shipping pallet, comprising the steps of:
providing a top deck;
providing a bottom skid;
providing at least one post;
integrally forming at least one collar with one of said top deck or said bottom skid; and
at least partially inserting said at least one post into said at least one collar such that said at least one post separates said top deck from said bottom skid;
providing at least one reinforcement;
inserting said at least one reinforcement into said at least one post to increase the strength of said at least one post;
providing at least one void as part of said bottom skid;
forming said at least one reinforcement in said at least one void during the molding of said bottom skid
providing at least one cross member formed as part of said bottom skid; and
integrally forming said at least one post as part of said at least one cross member.

11. The method for reinforcing a post formed as part of a shipping pallet of claim 10, further comprising the steps of forming a ribbed portion as part of said at least one cross member.

* * * * *